(12) United States Patent
Ferreira

(10) Patent No.: US 6,972,584 B1
(45) Date of Patent: Dec. 6, 2005

(54) POWER DECOUPLING CIRCUIT FOR LOOP POWERED TIME-OF-FLIGHT RANGING SYSTEMS

(75) Inventor: Edson Leocadio Ferreira, Peterborough (CA)

(73) Assignee: Siemens Milltronics Process Instruments Inc., Ontario (CA)

(*) Notice: Subject to any disclaimer, the term of this patent is extended or adjusted under 35 U.S.C. 154(b) by 0 days.

(21) Appl. No.: 10/953,459

(22) Filed: Sep. 30, 2004

(51) Int. Cl.[7] .............................. G01R 31/26
(52) U.S. Cl. ................. 324/765; 324/158.1
(58) Field of Search ............... 324/765, 754, 324/758, 158.1, 72.5; 702/60, 61, 64, 65; 714/719, 720, 724

(56) References Cited

U.S. PATENT DOCUMENTS 6,586,958 B2 * 7/2003 Sudo et al. .................. 324/765
6,836,173 B1 * 12/2004 Yang ........................... 327/390

* cited by examiner

Primary Examiner—Vinh Nguyen
Assistant Examiner—Jimmy Nguyen
(74) Attorney, Agent, or Firm—Harness, Dickey & Pierce, P.L.C.

(57) ABSTRACT

A power decoupling circuit for a time-of-flight ranging or level measurement system coupled to a current loop. The level measurement system receives power from the current loop and includes a loop current regulator. The loop current regulator is responsive to signals from a controller for regulating the current in the loop to transmit level measurement data and other information. Power is also taken from the current loop to energize a transducer for generating pulses for performing level measurements. The power decoupling circuit comprises a feedback circuit and a step-up converter. The step-up converter provides charging current to an energy storage device for the transducer and may also generate a voltage gain. The feedback circuit controls the voltage drop across the loop current regulator to minimize losses on it and maximize power available for measurement.

10 Claims, 4 Drawing Sheets

POWER DECOUPLING CIRCUIT FOR LOOP POWERED TIME-OF-FLIGHT RANGING SYSTEMS

FIELD OF THE INVENTION

The present invention relates to time-of-flight ranging systems, and more particularly to a power decoupling circuit apparatus for time-of-flight ranging or level measurement devices operating on a two-conductor current loop.

BACKGROUND OF THE INVENTION

Pulse-echo acoustic ranging systems, also known as time-of-flight ranging systems, are commonly used in level measurement applications. Pulse-echo acoustic ranging systems determine the distance to a reflector (i.e. reflective surface) by measuring how long after transmission of a burst of energy pulses the echoes or reflected pulses are received. Such systems typically use ultrasonic pulses or pulsed radar or microwave signals.

Time-of-flight ranging systems are commonly utilized in remote locations where process variable data is transmitted to another, e.g. central, location for further processing or collection. A common technique for transmitting such data is by a current loop. The value of the process variable is represented by the magnitude of a current passing through the loop, with the magnitude lying between predetermined minimum and maximum values, for example a minimum value around 4 mA and a maximum value around 20 mA, in what is termed a 4–20 mA current loop. Such a current loop has a high degree of noise immunity and has also gained widespread industrial acceptance.

The input power provided by the current loop is limited. The input power available on the input terminals for the level measurement device may be as low as 4 mA times the input voltage level. For a current loop, the voltage level is typically around 24 VDC which provides an input power of 100 milli-Watts. A series resistor for communication (e.g. a HART resistor) coupled to the current loop or a supply voltage with a voltage level lower than 24 VDC further reduces the input power available. The power input for operating/pulsing the transducer (e.g. ultrasonic transducer) is many times greater (e.g. 100 to 1000) than the input power. This has led to the design and development of circuitry where power is drawn from the current loop at a rate consistent with the available input power and stored in the level measurement device (for example, using a storage device like a capacitor) until there is enough energy to generate a high power pulse to drive the ultrasonic transducer. Because of the limit power available, energy storage and conversions must done efficiently.

To operate, a voltage gain also needs to be generated in the level measurement device. One known approach involves utilizing a step-up circuit which is driven by a square wave signal having a fixed duty cycle. While such a configuration provides the required voltage gain, it does not minimize the voltage drop across the current source for the current loop and leads to a less efficient system. In addition, the high power transitions associated with the ultrasonic pulses causes deeps in the output voltage levels which are transferred to the input voltages for the step-up circuit. The input voltage deeps tend to further reduce the efficiency.

In view of these deficiencies, a need remains for circuit improvements for current loop powered level measurement or time-of-flight ranging systems or devices.

BRIEF SUMMARY OF THE INVENTION

The present invention provides a power decoupling circuit for a time-of-flight ranging system or a level measurement system operating on a current loop.

In a first aspect, the present invention provides a level measurement device for coupling to a remote receiver through a two-conductor loop carrying a current signal, the two-conductor loop providing a signal path for the level measurement system to transmit process variable data to the remote receiver, the level measurement device comprises: a process variable measurement stage having, a transducer for emitting energy pulses and coupling reflected energy pulses; a controller having a receiver stage and a transmitter stage; the transducer is operatively coupled to the transmitter stage and is responsive to the transmitter stage for emitting the energy pulses, and the receiver stage is operatively coupled to the transducer for receiving reflected energy pulses coupled by the transducer, and the controller includes a component for processing the receiver output and generating measurement data; a current regulator, the current regulator is coupled to the current loop, and has an input port coupled to the controller for receiving a control signal to regulate the current signal in the current loop, the current signal is proportional to said measurement data; a power decoupling module, the power decoupling module comprises a converter, the converter has an input coupled to the output of the current regulator and an output, and the power decoupling module includes a control circuit for generating a control signal; a storage component, the storage component is coupled to the output of the converter for receiving a charging current derived from the current loop; the converter is responsive to the control signal for varying the current derived from the current loop for charging the storage component.

In another aspect, the present invention provides a level measurement device for coupling to a remote receiver through a two-conductor loop carrying a current signal, the two-conductor loop provides a signal path for the level measurement system to transmit process variable data to the remote receiver, the level measurement device comprises: a process variable measurement stage having, a transducer for emitting energy pulses and coupling reflected energy pulses; a controller having a receiver stage and a transmitter stage; the transducer is operatively coupled to the transmitter stage and is responsive to the transmitter stage for emitting the energy pulses, and the receiver stage is operatively coupled to the transducer for receiving reflected energy pulses coupled by the transducer, and said controller includes a component for processing the receiver output and generating measurement data; a current regulator, the current regulator is coupled to the current loop, and has an input port coupled to the controller for receiving a control signal to regulate the current signal in the current loop, the current signal is proportional to the measurement data; a shunt regulator, the shunt regulator includes a shunt resistor having one terminal connected to the output of the current regulator and another terminal coupled to an input port on the shunt regulator, and the shunt regulator has an output port coupled to the current loop; a power decoupling module, the power decoupling module comprises a converter, the converter has an input coupled to the output of the current regulator and an output, the power decoupling module has an input port coupled across the shunt resistor for inputting a signal corresponding to the voltage drop across the shunt resistor, a control circuit having an input for receiving the voltage drop and an input for a set-point from the controller and generating a control signal; a storage component, the storage component is coupled to the output of the converter for receiving a charging current derived from the current loop; the converter is responsive to the control signal for varying the charging current derived from the current loop for charging the storage component.

In yet another aspect, the present invention provides a power decoupling circuit for a level measurement device, the level measurement device is coupled to a current loop and includes a current regulator for regulating the current in the current loop and a storage component, the storage component is charged by current derived from the current loop, the power decoupling circuit comprises: a first component having an input port coupled to the current regulator for receiving an input representing a voltage drop across the current regulator, and the first component generates an output corresponding to the voltage drop across the current regulator; a second component has a first input coupled to the output of the first component, and a second input for receiving a reference signal, the second component generates an output control signal corresponding to the difference between the voltage drop and the reference signal; a converter having a control input, an input coupled to the output of the current regulator, and an output for outputting a charging current, the output is coupled to the storage component, the converter is responsive to is output control signal applied to the control input for varying said charging current.

In another aspect, the present invention provides a power decoupling circuit for a level measurement device, the level measurement device is coupled to a current loop and includes a current regulator for regulating the current in the current loop, a shunt regulator and a storage component, the shunt regulator includes a shunt resistor with one terminal connected to the output of the current regulator and another terminal coupled to an input port on the shunt regulator, the storage component is charged by current derived from said current loop, the power decoupling circuit comprises: a first component having an input port coupled across the shunt resistor for receiving an input representing a voltage drop across the shunt regulator, and the first component generates an output corresponding to the voltage drop across the shunt regulator; a second component having a first input coupled to the output of the first component, and a second input for receiving a reference signal, the second component generates an output control signal corresponding to the difference between the voltage drop on the shunt resistor and the reference signal; a converter having a control input, an input coupled to the output of the current regulator, and an output for outputting a charging current, the output is coupled to the storage component, the converter is responsive to the output control signal applied to the control input for varying the charging current.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the present invention and in which.

In the drawings, like references indicate like elements or components.

DETAILED DESCRIPTION OF THE EMBODIMENTS

Figure 1:
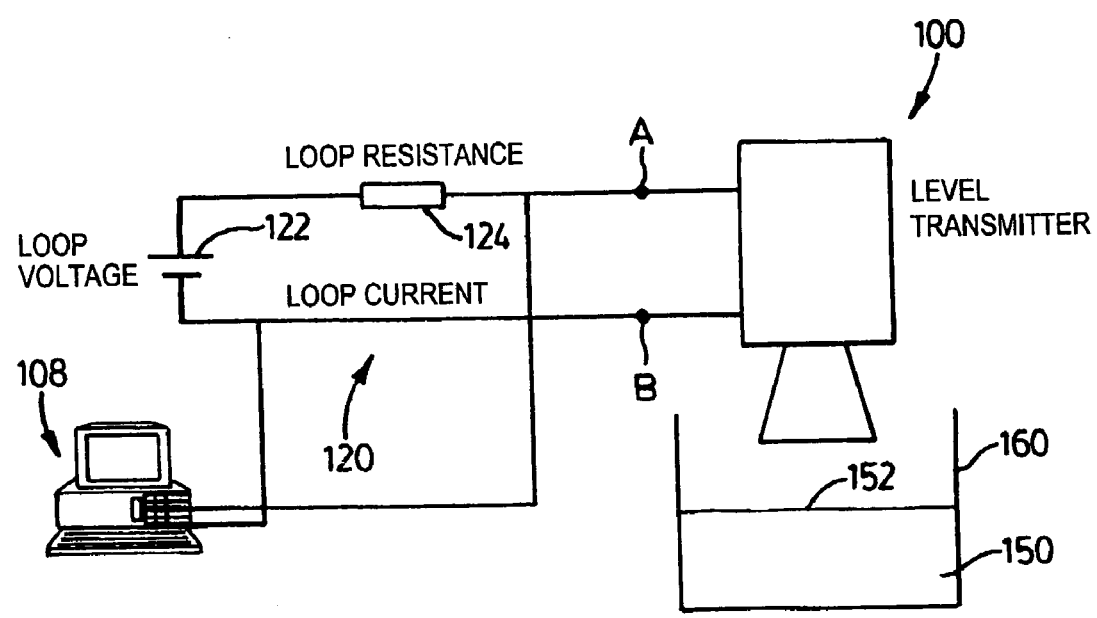
FIG. 1 shows in diagrammatic form a level measurement system operating on a current loop.

Reference is first made to FIG. 1 which shows a loop powered level measurement system with a power decoupling circuit or stage according to the present invention.

As shown, the loop powered level measurement system, indicated generally by reference 100, interfaces to a power/communication loop 120, for example a 4–20 mA current loop. The loop powered level measurement system 100 is coupled to the current loop 120 at terminals A and B. A remote receiver, for example a plant control computer, indicated by reference 108 is coupled at the other end of the current loop 120. For a typical 4–20 mA current loop configuration, the loop 120 provides a current in the range 4 to 20 mA and a loop voltage in the range 18 to 30 Volts. The loop voltage is nominally at 24 Volts and represented as a voltage source with reference 122. The resistance of the loop is represented as a resistive element 124 and is typically in the range 0 to 550 Ohms. While the loop current is normally in the range 4 to 20 mA, the current may range from 3.6 to 21.6 mA to indicate alarm conditions.

Figure 2:
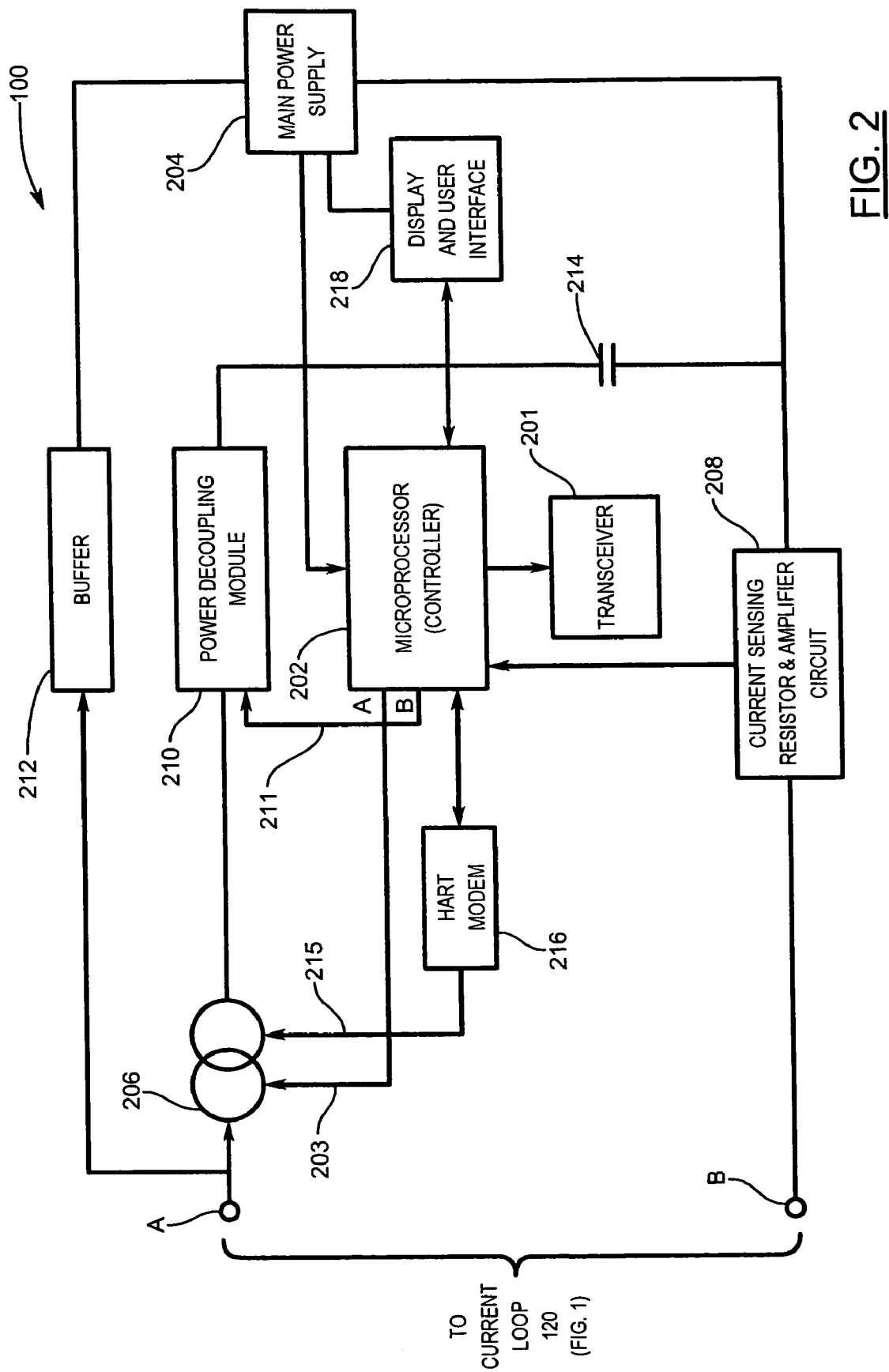
FIG. 2 shows in diagrammatic form a level measurement system having a power decoupling circuit in accordance with the present invention.

Reference is next made to FIG. 2 which shows in more detail the level measurement system with a power decoupling module or circuit 210 according to the invention. The level measurement system 100 comprises a transducer or transceiver module 201, a controller 202, a power supply 204, a loop current regulator 206, a loop current sensor and amplifier circuit 208, a power decoupling module 210, a buffer circuit 212, and an energy storage device 214 for example, a capacitor. The level measurement system 100 may also include a communication module 216. The buffer circuit 212 draws current from the loop 120 without lowering the loop impedance.

The power supply 204 comprises a switching power supply and is designed to consume less than the minimum loop current, i.e. nominally 4 mA.

The loop current regulator 206 is operated under firmware control by the controller 202 to draw additional current to achieve the desired current in the current loop 120. The loop current regulator 206 is connected to a branch (for example, at terminal A) of the current loop 120 and the input to the power decoupling module 210. The current regulator 206 has a control terminal on the Hart module 214 which is coupled to a control output port on the controller 202. The loop current regulator 206 also has a control input 203 which is coupled to the controller 202. The loop current sensor and amplifier circuit 208 senses the current flowing in the loop 120 (FIG. 1) and provides feedback for the controller 202.

The loop current sensor and amplifier circuit 208 may be implemented with a current sensing resistor and an amplifier as will be understood by one skilled in the art.

As shown in FIG. 2, the level measurement system 100 also includes a user interface module 218. The user interface module 218 comprises a display, for example, a LCD module, and a keypad or touch sensitive overlay on the LCD.

The transducer or transceiver module 201 is coupled to a control port and input/output port on the controller 202. The transducer module 201 includes a transducer (for example, as indicated by reference 330 in FIG. 3), a transmitter stage and a receiver stage (not shown). The transducer 330 (FIG. 3) may comprise ultrasonic-based technology, radar-based technology, TDR-based technology (time domain reflective), or other distance ranging technology. Under the control of a program stored in memory (e.g. firmware), the controller 202 generates a transmit pulse control signal for the transmit stage in the transducer module 201, and the transducer 330 (FIG. 3) emits a transmit burst of energy, for example, ultrasonic pulses directed at the surface of a material 150 (FIG. 1) contained in a storage vessel 160 (FIG. 1). The high energy pulse applied to the transducer 330 is derived from energy which is stored in the energy storage device or capacitor 212. The reflected or echo pulses, i.e. the propagated transmit pulses reflected by the surface 152 of the material 150 (FIG. 1), are coupled by the transducer, for example, an ultrasonic transducer 330 (FIG. 3), radar antenna or other distance ranging technology (not shown), in the transducer module 201 and converted into electrical signals by the receiver stage (not shown). The electrical signals are inputted by the controller 202 and sampled and digitized by an A/D converter (not shown) and a receive echo waveform or profile is generated. The controller 202 executes an algorithm which identifies and verifies the echo pulse and calculates the range, i.e. the distance to the reflective surface, from the time it takes for the reflected energy pulse to travel from the reflective surface 152 (FIG. 1) to the transducer 330 (FIG. 3) in the transducer module 201. From this calculation, the distance to the surface of the material 150 and thereby the level of the material 150 in the vessel 160 is determined. The controller 202 may comprise a microprocessor or a microcontroller with on-chip resources, such as an A/D converter, ROM (EPROM), RAM. The microprocessor or microcontroller is suitably programmed to perform these operations as will be within the understanding of those skilled in the art.

Referring to FIG. 2, power for the operation of the level measurement system 100 is derived from the current loop 120 (FIG. 1). The power supply module 204 comprises a switching power supply which takes its power input from the current loop 120 (FIG. 1) and generates the appropriate voltage levels, e.g. supply rails, for the circuitry, i.e. the controller 202, the display and user interface module 218 and the other electronic components or circuits in the level measurement system 100.

The controller module 202 also controls the transmission of data and control signals through the interface with the current loop 120 (FIG. 1). The controller 202 uses the loop current regulator 206 to adjust or modulate the loop current in the range 4 to 20 mA to transmit the calculated level of the material 150 to the remote receiver or plant computer 108 (FIG. 1) connected to the other end of the current loop 120 (FIG. 1). As shown in FIG. 2, the level measurement system 100 may include the communication module 214. The communication module 214 includes a digital communication modem, for example a HART modem, which provides another communication channel between the controller 202 and the remote computer 108 (FIG. 1) over the wires of the current loop 120.

In operation, the user interface module 218 comprising the display module and the keypad, and the communication module 216 are run continuously. The display, user interface and communication operations may be thought of as primary functions which run continuously. The transducer module 201 (i.e. the transducer 330) is operated intermittently or pulsed to transmit energy pulses and detect reflected energy pulses from the surface of the material 150 (FIG. 1) contained in the vessel 160 (FIG. 1).

The power available from the current loop 120 (FIG. 1) for the level measurement system 100 is given by:

$$(\text{loop voltage} - (\text{loop current} \times \text{loop resistance})) \times \text{loop current}$$

In order to achieve the fastest operation rate, all available power from the current loop 120 is utilized by the level measurement system 100. The controller 202 sets a reference to the power decoupling circuit 210 through control 211. The reference is a fixed value and alternatively can be set with a non-processed circuit (e.g. an analog voltage reference). The reference is used to control the drop voltage across the loop current regulator 206. As a result, the power decoupling circuit 210 operates to minimize losses on the current regulator 206 independently of the loop voltage and resistance.

The power decoupling module or circuit 210 functions to efficiently tap power from the current loop 120 and to also provide a voltage gain for use by circuitry in the level measurement device 100, as will be described in more detail below.

Figure 3:
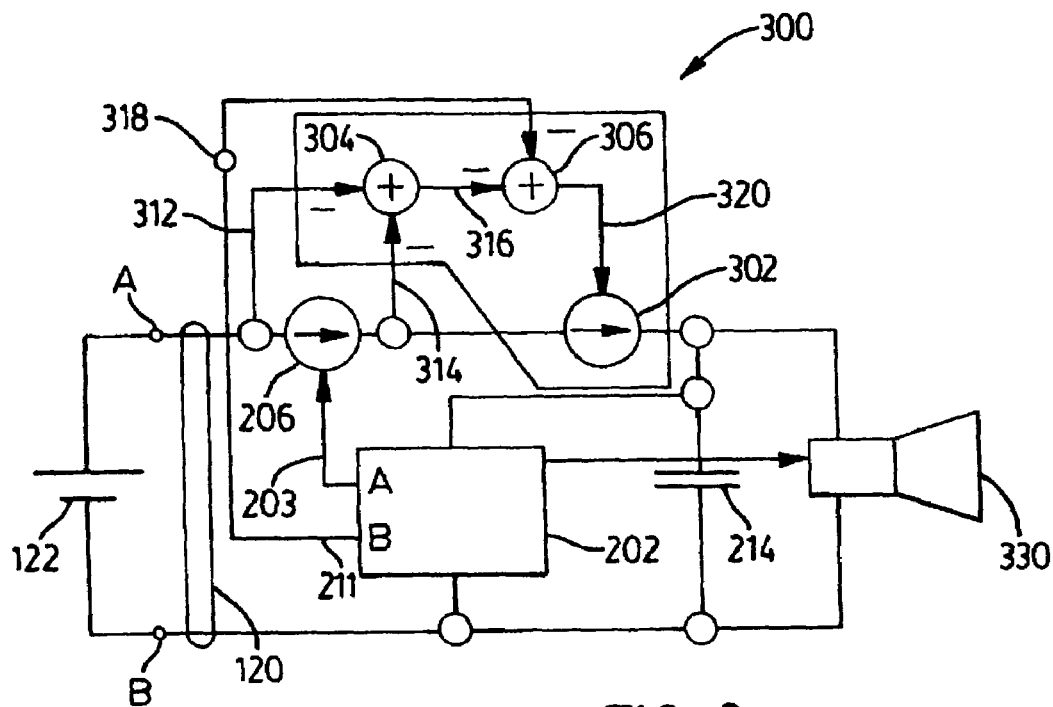
FIG. 3 shows in schematic form one embodiment of the power decoupling circuit in accordance with the present invention.
Figure 5:
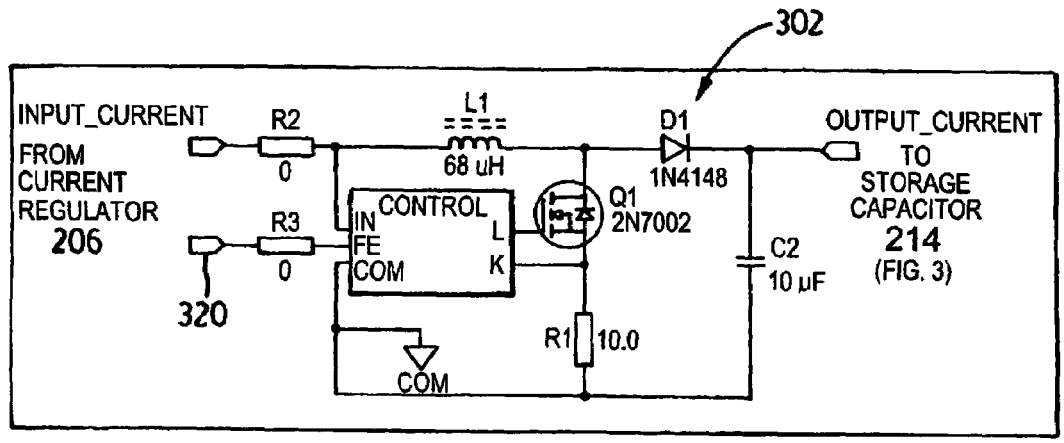
FIG. 5 shows a circuit schematic of an exemplary implementation for the step-up converter for the power decoupling circuit of FIG. 2.

Reference is made to FIG. 3, which shows an embodiment of the power decoupling circuit 210 (FIG. 2) in accordance with the present invention and indicated generally by reference 300. More particularly, FIG. 3 illustrates a control strategy for the power decoupling circuit 300. (In FIGS. 1 to 3, like components or elements are indicated by like references.) The power decoupling circuit 300 comprises a step-up converter 302, a first summing component 304, and a second summing component 306. The step-up converter 302 functions to convert current from the loop current regulator 206 for charging the storage capacitor 212, and also to generate a voltage gain. The step-up converter 302 may be implemented using a "boost" circuit topology as depicted by the circuit schematic of FIG. 5.

Figure 6:
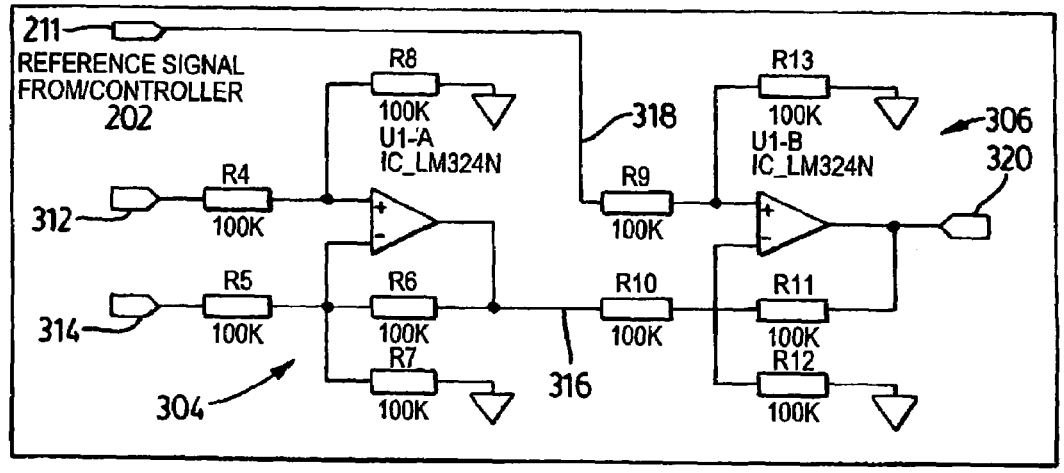
FIG. 6 shows a circuit schematic of an exemplary implementation for the summing components for the power decoupling circuit of FIG. 2.

As shown, the first summing component 304 has a summing input 312 and a differencing input 314. The summing input 312 is coupled to terminal A and receives current flow from the current loop 120. The differencing input 314 is coupled to the output of the loop current regulator 206 and receives current outputted by the loop current regulator 206. The output from the first summing component 304 provides a differencing input 316 to the second summing component 306. The second summing component 306 includes a summing input 318 which is coupled to the output 211 or B on the controller 202. The controller 202 includes a firmware component or function that generates a reference or output signal B on output 211 which is outputted to the input 318 and applied to the second summing component 306, as will be described in more detail below. The output from the second summing component 306 provides a control input 320 (i.e. control current) to the step-up converter 302, as will also be described in more detail below. The first and second summing components 304, 306 may be implemented, for example, using a two operational amplifier circuit as depicted in FIG. 6.

In operation, the power decoupling circuit 300 controls the voltage drop across the loop current regulator 206 and operates to minimize the drop voltage. The controller 202 includes a firmware component or function which sets the loop current regulator 206 to a set-point "A" using the control output 203. The current set-point "A" is proportional to the calculated level measurement distance and this information is transmitted using the current loop 120 to a remote location for example, the plant computer 108 (FIG. 1). The output 316 from the first summing component 304 represents the voltage drop across the loop current regulator 206. The output 316 is applied to the second summing component 306 and subtracted from the output signal B on the output 211 from the controller 202 which is applied to the summing input 318 of the second summing component 306. The output signal B on the output 211 represents a set-point corresponding to a constant (i.e. minimum) voltage drop across the loop current regulator 206. The second summing component 306 takes the difference between the set-point drop voltage on the output 211 (i.e. output signal "B") and the voltage drop across the loop current regulator 206 (as indicated by the output signal 316) to generate an input control current for the step-up converter 302. As a consequence, the current drawn by the step-up converter 302 is adjusted to the maximum available current that is the current imposed by the loop current regulator 206. This in turn minimizes any losses across the loop current regulator 206, and maximizes the energy available for storing in the capacitor 212. In other words, the power decoupling circuit 300 operates to control the drop voltage across the loop current regulator 206.

Figure 4:
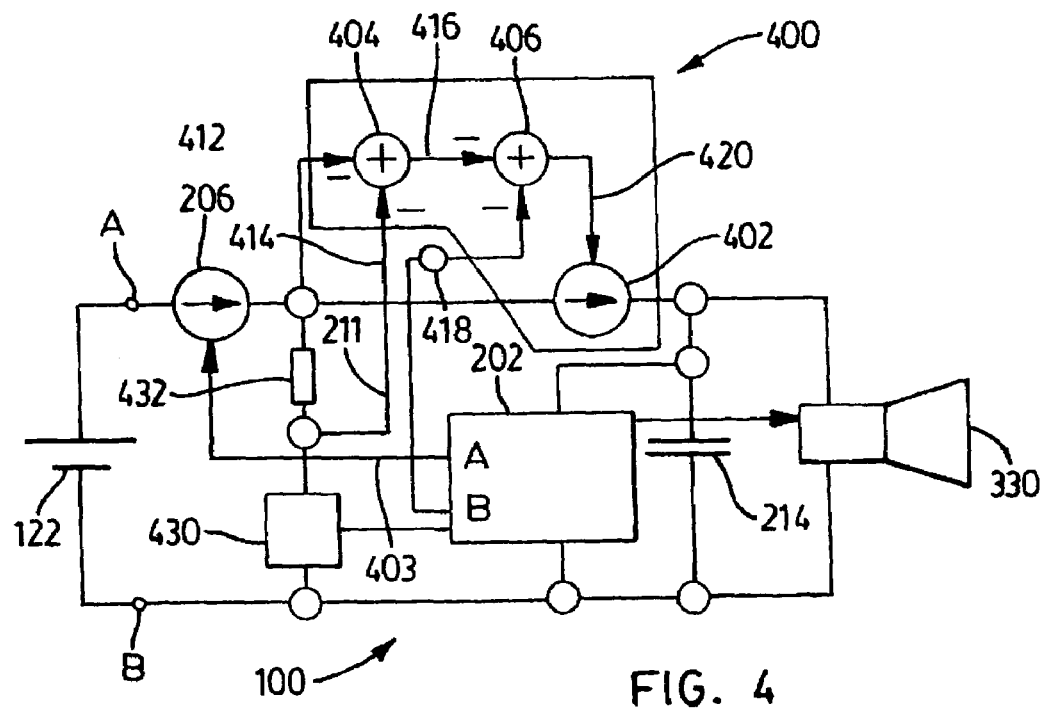
FIG. 4 shows in schematic form another embodiment of the power decoupling circuit in accordance with the present invention.

Reference is next made to FIG. 4, which shows another embodiment of a power decoupling circuit 210 according to the present invention and indicated generally by reference 400. In this embodiment, the circuitry for the level measurement device 100 includes a shunt regulator indicated by reference 430. The shunt regulator 430 may comprise additional circuitry in the level measurement device 100 which is powered by a shunt current derived from the loop current regulator 206 or different circuit topology for the level measurement device 100. As shown, the power decoupling circuit 400 comprises a step-up converter 402, a first summing component 404, and a second summing component 406. The first summing component 404 has a differencing input 412 and a summing input 414. The output from the first summing component 404 provides a differencing input 416 to the second summing component 406. The second summing component 406 includes a summing input 418 which is coupled to the output 211 or B on the controller 202. The controller 202 includes a firmware component or function that generates a reference signal for the output signal 211 or B which is inputted on the input 418 and applied to the second summing component 406, as will be described in more detail below. The output from the second summing component 406 provides a control input 420 (e.g. a current control input) to the step-up converter 402.

As shown in FIG. 4, the shunt regulator 430 has input port which is coupled to a shunt resistor 432, and one terminal of the shunt resistor 432 is connected to the output of the loop current regulator 206. The shunt regulator 430 is operated by the controller 202 under the control of firmware to provide additional functionality, such as regulating the voltage at the output of the loop current regulator 206. As shown, the output of the loop current regulator 206 also forms the differencing input 412 for the first summing component 404. The summing input 414 for the first summing component 404 is taken from the other terminal of the shunt resistor 432. As also shown, a control input 403 to the loop current regulator 206 is provided by output signal A from the controller 202. The voltage supply for the current loop 120 is represented by reference 122 in FIG. 4.

In operation, the voltage drop across the shunt resistor 432 is used to control the first summing component 404 to generate the differencing output signal 416 which is applied to the differencing input of the second summing component 406. The second summing component 406 subtracts the output 416 from the output signal B applied to the positive input of the second summing component 406. The output signal 420 from the second summing component 406 is then applied to the step-up converter 402. As described above, the output signal "B" is provided on the output 211 by the controller 202 under firmware control and serves as a set-point for the step-up converter 402 corresponding to a constant (i.e. minimum) current for the shunt resistor 432 and the shunt regulator 430. As the current flowing through the shunt regulator 430 (and the shunt resistor 432) is controlled to a minimum by the power decoupling circuit 400, the current flowing through the step-up converter 402 is maximized in order to improve efficiency.

The preceding detailed description of specific embodiments of the present invention does not limit the implementation of the invention to any particular programming language or signal processing architecture. In one embodiment, the present invention is implemented, at least partly, using a digital signal processor. It will be understood that the present invention may be implemented using other architectures, including a microprocessor, a microcontroller, a field programmable logic device such as a field programmable gate array, discrete electronic components or combinations thereof. Any limitations presented herein as a result of a particular type of architecture or programming language are not intended as limitations of the present invention.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A level measurement device for coupling to a remote receiver through a two-conductor loop carrying a current signal, the two-conductor loop providing a signal path for the level measurement system to transmit process variable data to the remote receiver, said level measurement device comprising:

a process variable measurement stage comprising, a transducer for emitting energy pulses and coupling reflected energy pulses;

a controller having a receiver stage and a transmitter stage;

said transducer being operatively coupled to said transmitter stage and being responsive to said transmitter stage for emitting said energy pulses, and said receiver stage being operatively coupled to said transducer for receiving reflected energy pulses coupled by said transducer, and said controller including a component for processing said receiver output and generating measurement data;

a current regulator, said current regulator being coupled to the current loop, and having an input port coupled to said controller for receiving a control signal to regulate the current signal in the current loop, said current signal being proportional to said measurement data;

a power decoupling module, said power decoupling module comprising a converter, said converter having an input coupled to the output of said current regulator and an output, and said power decoupling module including a control circuit for generating a control signal;

a storage component, said storage component being coupled to the output of said converter for receiving a charging current derived from the current loop;

said converter being responsive to said control signal for varying the current derived from the current loop for charging said storage component.

2. The level measurement device as claimed in claim 1, wherein said converter comprises a step-up converter for producing a voltage gain for charging said storage component.

3. The level measurement device as claimed in claim 1, wherein said control circuit comprises a first stage and a second stage, said first stage generating an output, said output representing the voltage drop across said current regulator, said second stage being responsive to the output from said first stage and a set-point from said controller to generate the control signal for the converter.

4. The level measurement device as claimed in claim 3, wherein said first stage comprises a first summing component and a second summing component, said first summing component having an output, a negative input coupled to a terminal of said current regulator, and a positive input coupled to another terminal of said current regulator, said second summing component having a negative input coupled to the output of said first summing component, and a positive input for receiving an output signal from said controller, and an output for said control signal.

5. The level measurement device as claimed in claim 1, wherein said control circuit comprises a feedback network, said feedback network having a first stage and a second stage, said first stage generating an output, said output representing the voltage drop across said current regulator, said second stage being responsive to the output from said first stage and a set-point from said controller to generate the control signal for the converter.

6. A level measurement device for coupling to a remote receiver through a two-conductor loop carrying a current signal, the two-conductor loop providing a signal path for the level measurement system to transmit process variable data to the remote receiver, said level measurement device comprising:

a process variable measurement stage comprising, a transducer for emitting energy pulses and coupling reflected energy pulses;

a controller having a receiver stage and a transmitter stage;

said transducer being operatively coupled to said transmitter stage and being responsive to said transmitter stage for emitting said energy pulses, and said receiver stage being operatively coupled to said transducer for receiving reflected energy pulses coupled by said transducer, and said controller including a component for processing said receiver output and generating measurement data;

a current regulator, said current regulator being coupled to the current loop, and having an input port coupled to said controller for receiving a control signal to regulate the current signal in the current loop, said current signal being proportional to said measurement data;

a shunt regulator, said shunt regulator including a shunt resistor having one terminal connected to the output of said current regulator and another terminal coupled to an input port on said shunt regulator, and said shunt regulator having an output port coupled to the current loop;

a power decoupling module, said power decoupling module comprising a converter, said converter having an input coupled to the output of said current regulator and an output, said power decoupling module having an input port coupled across said shunt resistor for inputting a signal corresponding to the voltage drop across said shunt resistor, a control circuit having an input for receiving said voltage drop and a set-point from said controller and generating a control signal;

a storage component, said storage component being coupled to the output of said converter for receiving a charging current derived from the current loop; and said converter being responsive to said control signal for varying the charging current derived from the current loop for charging said storage component.

7. The level measurement device as claimed in claim 6, wherein said converter comprises a step-up converter for producing a voltage gain for charging said storage component.

8. The level measurement device as claimed in claim 6, wherein said control circuit comprises a first stage and a second stage, said first stage generating an output, said output representing the voltage drop across said shunt resistor, said second stage being responsive to the output from said first stage and a set-point from said controller to generate the control signal for the converter.

9. The level measurement device as claimed in claim 8, wherein said first stage comprises a first summing component and a second summing component, said first summing component having an output, a negative input coupled to one terminal of said shunt resistor, and a positive input coupled to another terminal of said shunt resistor, said second summing component having a negative input coupled to the output of said first summing component, and a positive input for receiving an output signal from said controller, and an output for outputting said control signal to said converter.

10. The level measurement device as claimed in claim 9, wherein said converter comprises a step-up converter for producing a voltage gain for charging said storage component.

* * * * *